(12) United States Patent
Gandham et al.

(10) Patent No.: US 8,005,002 B2
(45) Date of Patent: *Aug. 23, 2011

(54) METHOD AND APPARATUS FOR PERFORMING A QUERY-BASED CONVERGECAST SCHEDULING IN A WIRELESS SENSOR NETWORK

(75) Inventors: Shashidhar R. Gandham, Richardson, TX (US); Ying Zhang, Cupertino, CA (US); Qingfeng Huang, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 963 days.

This patent is subject to a terminal disclaimer.

(21) Appl. No.: 11/934,676

(22) Filed: Nov. 2, 2007

(65) Prior Publication Data

US 2008/0112387 A1    May 15, 2008

Related U.S. Application Data

(60) Provisional application No. 60/857,927, filed on Nov. 9, 2006.

(51) Int. Cl.
  *G01R 31/08*    (2006.01)
  *G06F 11/00*    (2006.01)
  *H04B 7/212*    (2006.01)
  *H04L 12/28*    (2006.01)
  *H04L 12/43*    (2006.01)
(52) U.S. Cl. ............ 370/252; 370/324; 370/395.4; 370/458
(58) Field of Classification Search .......... None
  See application file for complete search history.

(56) References Cited

U.S. PATENT DOCUMENTS

| 7,505,450 | B2 * | 3/2009 | Castagnoli | 370/350 |
| 7,675,884 | B2 * | 3/2010 | Ye | 370/329 |
| 2005/0157698 | A1 * | 7/2005 | Park et al. | 370/351 |
| 2006/0019677 | A1 * | 1/2006 | Teague et al. | 455/456.3 |

OTHER PUBLICATIONS

V. Annamalai, S. K. S. Gupta and L. Schwiebert, "On Tree-Based Convergecasting in Wireless Sensor Networks", 2003, IEEE pp. 1-5.*

* cited by examiner

*Primary Examiner* — Gregory B Sefcheck
*Assistant Examiner* — Ashley L Shivers
(74) *Attorney, Agent, or Firm* — Park, Vaughan, Fleming & Dowler LLP; Shun Yao

(57) ABSTRACT

One embodiment of the present invention provides a system that performs a query-based convergecast scheduling in a convergecast network, which includes a base-station and a plurality of nodes. During operation, the system receives a convergecast tree for the convergecast network. Each node in the convergecast tree is associated with a hop-count to the base-station through a specific branch and each node can generate zero or more packets to transmit. Next, the system initializes a query from the base-station, wherein the query is successively propagated to the nodes through the branches. In response to the query, the system computes distributed-timing-information indicating a packet transmission schedule for the nodes. The system next aggregates the distributed-timing-information associated with the nodes toward the base-station through the branches. The system then forwards the aggregated distributed-timing-information to the plurality of nodes. Finally, each node constructs an optimized-convergecast-schedule for the convergecast tree based on the aggregated distributed-timing-information.

24 Claims, 11 Drawing Sheets

TREE NETWORK 200

METHOD AND APPARATUS FOR PERFORMING A QUERY-BASED CONVERGECAST SCHEDULING IN A WIRELESS SENSOR NETWORK

RELATED APPLICATION

This application claims priority under 35 U.S.C. section 119(e) to U.S. Provisional Application Ser. No. 60/857,927, entitled "Distributed Minimal Time Convergecast Scheduling for Small or Sparse Data Sources," by the same inventors as the instant application, filed on 9 Nov. 2006, the contents of which are herein incorporated by reference.

GOVERNMENT LICENSE RIGHTS

This invention was made with United States Government support under Contract No. F33615-0-C-1904 awarded by the ARPA/Airforce. The United States Government has certain rights in the invention.

BACKGROUND

1. Field of the Invention

The present invention relates to wireless sensor networks. More specifically, the present invention relates to a method and an apparatus for performing a query-based convergecast scheduling to achieve an optimal convergecast time in a wireless sensor network.

2. Related Art

Many applications of sensor networks involve periodically collecting all the data generated by sensor nodes at the base-station. In these applications, all the data packets generated in the network have to be transmitted to a base-station for record-keeping or for intensive computational-analysis. Examples of such applications include acquiring periodic global snapshots of the network state, monitoring the residual energy of nodes, and localizing a sniper in urban environment. Consequently, this many-to-one communication pattern, referred to as a "convergecast," is highly important in sensor networks.

SUMMARY

One embodiment of the present invention provides a system that performs a query-based convergecast scheduling in a convergecast network, which includes a base-station and a plurality of nodes. During operation, the system receives information which represents a logical convergecast tree for the convergecast network. This logical convergecast tree includes one or more branches. Each node in the convergecast tree is associated with a hop count for a route to the base-station through a specific branch and each node can generate zero or more packets to transmit. Next, the system initializes a query from the base-station, wherein the query is successively propagated to the plurality of nodes through the branches. In response to the query, the system then computes distributed timing information which indicates a packet transmission schedule for the node. The system next aggregates the distributed timing information associated with the plurality of nodes toward the base-station through the branches. The system then forwards the aggregated distributed-timing-information to the plurality of nodes. Finally, each node constructs an optimized convergecast schedule for the logical convergecast tree based on the aggregated distributed-timing-information.

In a variation of this embodiment, the system computes the timing information which indicates packet transmission from node i, which is i-hops from the based station by: (1) receiving the query from a parent node (i−1), wherein the query includes timing information associated with the parent node; (2) computing timing data $F_i$ in the timing information for node i based on the query; (3) updating the query to include the time information associated with node i; and (4) if a child node (i+1) exists, propagating the updated query to the child node (i+1).

In a further variation of this embodiment, if a child node (i+1) does not exist, the system reversely propagates the updated query to the parent node (i−1).

In a further variation, timing data $F_i$ indicates the first time node i transmits a packet to the base-station.

In a further variation, the system updates the query to include the timing information for node i by: (1) computing intermediate timing data $G_i$ as a function of timing data $F_i$ and the number of packets $p_i$ generated by node i, wherein $G_i$ indicates the last time node i transmits a self-generated packet to the base-station; and (2) including $G_i$ in the query.

In a further variation, the system computes timing data $F_i$ based on the query by obtaining timing data $F_i$ as a function of intermediate timing data $G_{i-1}$ associated with the parent node (i−1).

In a further variation, the system computes timing data $O_i$ for node i based on intermediate timing data $G_i$, wherein timing data $O_i$ indicates the last time node i transmits a self-generated packet to the base-station.

In a further variation, the system receives a response back from the child node (i+1), wherein the response includes timing data $L_{i+1}$ in the timing information associated with the child node (i+1). The system then computes timing data $L_i$ associated with node i based on timing data $L_{i+1}$. If a parent node (i−1) exists, the system reversely propagates the timing data $L_i$ to the parent node (i−1) to be used to compute timing data $L_{i-1}$ for the parent node (i−1).

In a further variation, if a parent node (i−1) does not exist, the system propagates the updated query to the base-station.

In a further variation, timing data $L_i$ indicates the last time node i transmits a packet to the base-station and timing data $L_{i+1}$ indicates the aggregated effects from all child nodes for node i.

In a variation of this embodiment, the system constructs the optimized convergecast schedule for the logical convergecast tree by computing a frequency of sending packets to the base-station for each branch in the set of branches based on the aggregated timing information.

In a further variation of this embodiment, the system computes the frequency for each branch based on the aggregated timing information by assigning a higher frequency to a branch associated with a higher number of remaining time slots to complete the convergecast operation.

In a variation of this embodiment, the system performs a convergecast operation in the convergecast network based on the optimized convergecast schedule.

Another embodiment of the present invention provides a system that optimizes packet transmission during a convergecast operation in a convergecast network that comprises a base-station and a plurality of nodes. During operation, the system receives a request to perform the convergecast operation. The system then schedules packet transmission for each node based on a set of predetermined criteria to obtain a scheduled order. Next, the system performs packet transmissions in a logical convergecast tree using the scheduled order. Specifically, while performing the packet transmissions using the scheduled order, the system aggregates multiple packets into a single packet to reduce transmission overhead.

In a variation of this embodiment, the multiple original packets are data packets which include a small amount of data.

DETAILED DESCRIPTION

Figure 1:
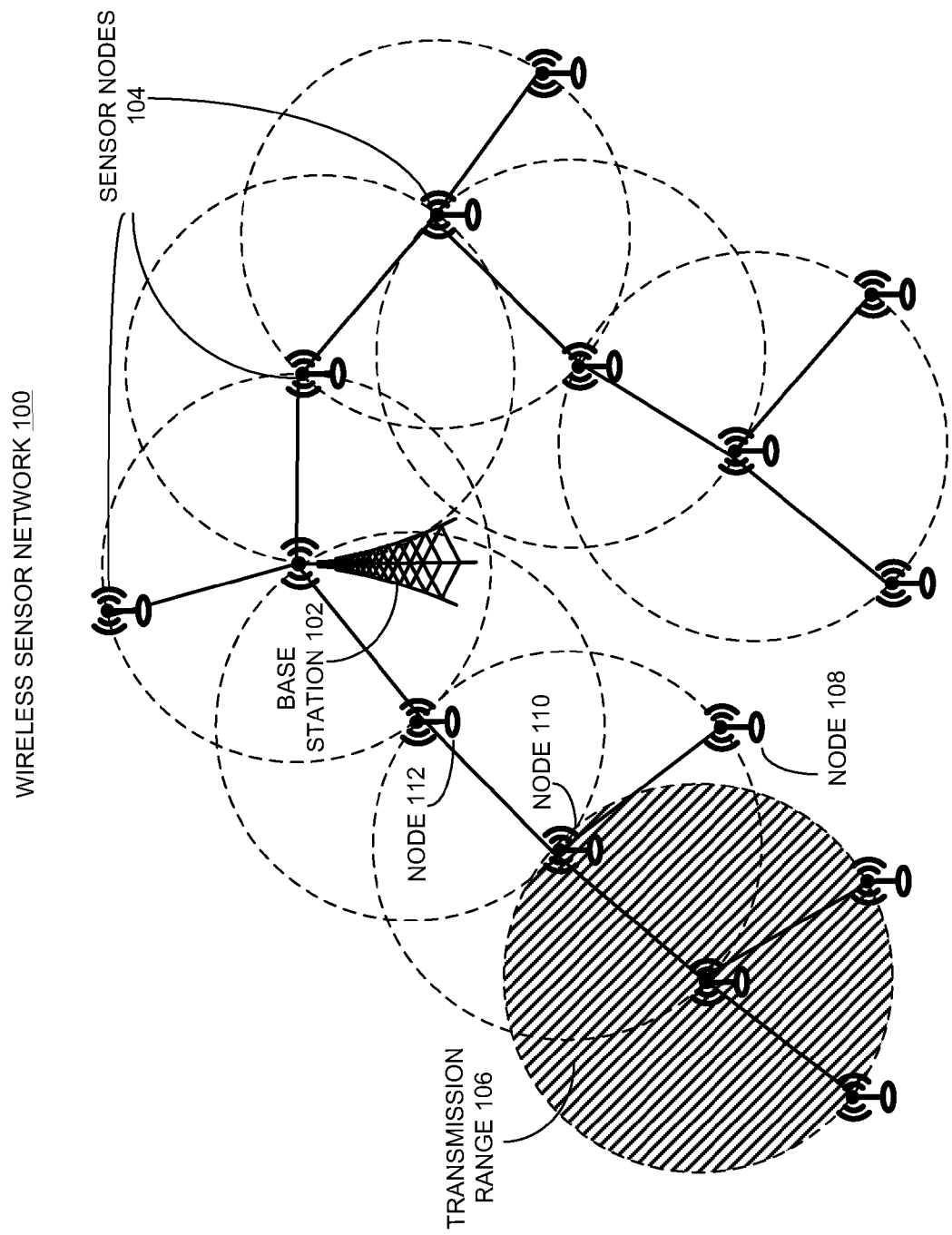
FIG. 1 illustrates a wireless sensor network in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Overview

Typically, convergecast in sensor networks involves a large number of the nodes forwarding data to the base-station in a relatively short interval of time. This "bursty" nature of convergecast leads to a high probability of data packet collisions at sensor nodes and data losses in the network, particularly when contention-based medium access control (MAC) protocols, such as carrier sense multiple access (CSMA) are used because of their simplicity and low overhead. Furthermore, using recovery methods such as retransmission to remedy these data losses inevitably increases convergecast latency and leads to more collisions in high data rate applications, in addition to consuming extra energy. A radially coordinated transmission delay has been proposed to decrease the probability of collisions. For example, a reliable bursty convergecast employs retransmission-based error control and scheduling of retransmissions. However, as a result of using CSMA at the MAC layer, the additional convergecast latency resulting from radial coordination is far from optimal.

Previously, an optimal-distributed-convergecast-scheduling model was proposed in "*Distributed Minimal Time Convergecast Scheduling in Wireless Sensor Networks*," by S. Gandham and Y. Zhang and Q. Huang, IEEE ICDCS06, 2006 ("Gandham" hereafter). This convergecast scheduling model has demonstrated a near minimum convergecast latency time during a collision-free convergecast operation. However, the above model was developed based on the following assumptions: (1) MAC layer data-frame is long enough to forward exactly one packet in a time slot; and (2) every node has exactly one packet to be forwarded to the base-station. Consequently, this model may not achieve an optimal convergecast time in a general scenario when some nodes have several packets to be forwarded to the base-station while other nodes do not have any data to report. We referred to this general type of data packet distribution as "sparse data sources."

Sparse data sources are commonly encountered during sensor network deployments wherein nodes maintain a log of the data corresponding to events detected, and forward the data to the base-station only when receiving a query. Note that in such an on-demand service situation, some nodes can have a large number of data to report while some other nodes may have none. Sparse data sources can also occur in places where sensor tasking (e.g., sampling rate) varies across the network for energy efficiency purposes.

Moreover, Gandham's model also ignores an important generalization: packet aggregation when the size of data is much smaller than the size of the data frame. Note that in many sensor network applications, the size of data is only a couple of bytes while the maximum data-frame length supported by the MAC layer can be much larger. For example, the acoustic sensor reading used in a shooter localization application requires six bytes data and the header size of a data frame in TinyOS MAC is also six bytes long. As a result, 50% overhead is incurred in forwarding a packet at every hop on its way to the base-station. Note that the total size of the data frame supported by TinyOS MAC layer is 36 bytes. Consequently, by aggregating multiple packets into a single data-frame the overhead can be significantly reduced.

Embodiments of the present invention provide a distributed convergecast scheduling mechanism that takes into account sparse data sources and packet aggregation in a wireless sensor network.

System Model and Problem Formulation for a Convergecast-network

System Model

FIG. 1 illustrates a wireless sensor network 100 in accordance with an embodiment of the present invention. As illustrated in FIG. 1, wireless sensor network 100 includes a base-station 102 and a plurality of sensor nodes 104. During a typical convergecast operation, some or all of nodes 104 send data packets to base-station 102. Note that each sensor node can have zero or more data packets to transmit.

In one embodiment of the present invention, both base-station 102 and sensor nodes 104 can be static. Furthermore, each of the sensor nodes 104 is equipped with an omni-directional transceiver. In one embodiment of the present invention, all of the communications can be carried over a single frequency band. In this case, the nodes (including the base-station) cannot transmit and receive at the same time. Note that the transceiver in a node has a transmission range 106. Due to the limited range of the transceiver, most of sensor nodes 104 cannot communicate with base-station 102 directly. Consequently, a distant node typically communicates with base-station 102 by relaying data through a specific path. For example, node 108 can send data to base-station 102 through the following chain of nodes 108→110→112→base-station 102. This process of relaying data between nodes is referred to as "hopping," and the number of hops is referred to as a "hop-count." Note that in general node 108 can use multiple paths to send data to base-station 102. However, there exists a "shortest" path with the least number of hops.

In one embodiment of the present invention, the bandwidth of every wireless link in the network can be the same and the network connectivity can be fixed over time, i.e., no power control is applied. In this embodiment, only symmetric links are considered during a convergecast scheduling operation. In one embodiment of the present invention, the transmission range of a node is assumed to be equal to the node's interference range. In a further embodiment, a relaxation on this assumption is considered.

In one embodiment of the present invention, we assume the maximum length of a data packet is fixed. The scheduling is performed under the condition that base-station 102 has to receive all the data packets generated by nodes 104 without aggregation of the packets at intermediate nodes. In a further embodiment, the scheduling can be performed with packet aggregation, wherein a set of packets are assembled into one packet before transmission.

In one embodiment of the present invention, the time domain is sliced into "timeslots," which are similar to timeslots in time division multiple access (TDMA) protocols. Similar to most TDMA schedules, we assume global time synchronization and a timeslot is the time to send one packet over the radio.

Problem Formulation

Let $G(V, E)$ represent the wireless sensor network, where (i) $V-\{s\}$ represents the set of sensor nodes; (ii) s represents the base-station or the "sink" (note that terms "base-station" and "sink" are used interchangeably throughout); and (iii) $E \subset V \times V$ represents the set of wireless links. Let $p_v(0)$ be the number of packets that originate at a node v, and $p_v(j)$ be the number of packets at node v in time slot j. Let $f_v: T \rightarrow V$ represent the action of node v at different time slots; $f_u(j)=v \wedge u \neq v$ implies that node u transmits a packet to v at time slot j; $f_u(j)=u$ implies that u does not transmit in time slot j. We need to identify a schedule $f_v, v \in V-\{s\}$ such that:

1) $p_s(l)=\Sigma_{\forall v \in V-\{s\}} p_v(0)$. All the packets should reach the sink by the last time slot l.
2) If $f_u(j)=v$ (u transmits a packet to v in time slot j) then:
   (u, v)∈E. The edge (u, v) exists in the network.
   $p_u(j-1)>0 \wedge p_u(j)=p_u(j-1)-1 \wedge p_v(j) = p_v(j-1)+1$. Node u has at least one packet at the end time slot j−1 and exactly one packet is transmitted along the edge (u, v) in time slot j.
   $f_v(j)=v$ and $f_w(j)=w$ $\forall (w, v) \in E$, $w \neq u$. Node v and the neighbors of v, except u, cannot transmit in time slot j.

One of the goals of the present invention is to minimize l, the total number of time slots required to complete the convergecast operation. Note that the convergecast scheduling problem is known to be NP-complete. To solve this problem, one embodiment of the present invention first considers networks of simple topology, such as a linear network, a multi-line network, and trees. For these simple topologies, distributed optimal-time models are derived. Next, for a network of arbitrary topology, a breadth-first search (BFS) tree is first built, and the models derived for the trees are used in combination with filtering of conflicting branches. Note that although the models are no longer optimal for the general networks, they are associated with a provable time-bound that is independent to the density of the network.

We first summarize the distributed convergecast scheduling technique that assumes every node has exactly one packet to be forwarded to the base-station. We refer to this scheduling technique as a "basic convergecast scheduling model." We then describe the present invention of (1) convergecast scheduling with packet aggregation and (2) convergecast scheduling with nodes generates none or multiple packets, with reference to the basic convergecast scheduling model.

Basic Convergecast Scheduling Model

The basic convergecast scheduling model for each node having one packet is derived by first considering a linear network of nodes and then developing a scheduling for a multi-line network that can be reduced into multiple linear networks with the base-station as the point of intersection. Next, a tree network can be reduced into an equivalent multi-line network, thus, allowing obtaining a convergecast schedule for tree networks. For a general network, a breath-first tree rooted at the sink will be built first and then the scheduling model for tree networks will be applied. Note that the basic convergecast scheduling model is described in detail in a U.S. patent application Ser. No. 11/314,616, entitled "Method and Apparatus for Optimizing Convergecast Operations in a Wireless Sensor Network," by the same inventors as the instant application, filed on 20 Dec. 2005, which is incorporated by reference herein.

Linear Networks

A linear network consists of a linearly connected set of nodes, with the sink at one end. Given N nodes, the hop-count from a node to the sink ranges from 1 to N. During an initialization process, the hop-count to the sink is obtained at each node. During convergecast a node will be in one of the following states: (1) T: the node can transmit, (2) R: the node may receive from a neighboring node, and (3) I: the node neither transmits nor receives.

Each node in the linear network is assigned an initial state based on its "hop distance" from the base-station. Starting with the first node, every third node (i.e, 1st, 4th, 7th, etc.) is in initial state T. Starting with the second node every third node (i.e, 2nd, 5th, 8th, etc.) in the network is assigned state I as its initial state. Starting with third node from the base-station every third node (i.e, 3rd, 6th, 9th, etc.) is assigned state R before the start of the convergecast. All nodes move from one state to another in the subsequent time slots according to the state transition T→I→R→T.

It has been shown in "*Distributed Minimal Time Convergecast Scheduling in Wireless Sensor Networks,*" by S. Gandham and Y. Zhang and Q. Huang, IEEE ICDCS06, 2006 ("Gandham" hereafter), that the above-described convergecast scheduling model is near-optimal and requires exactly 3N−2 time slots (one slot more than the optimal 3N−3). An important property of this scheduling model is that nodes require to buffer at most two packets in any time slot, given that each node has one packet initially.

Multi-line Networks

A naive way to schedule transmissions in a multi-line network is to schedule transmissions along one branch at a time. However, scheduling multiple branches concurrently may require relatively fewer number of time slots to complete convergecast. Note that the base-station is equipped with a single transceiver. Hence, at most one packet can be received by the base-station in a time slot. Convergecast scheduling in multi-line networks involves deciding the branch along which a packet can be forwarded to the base-station in every time slot.

During the initialization phase, each node obtains its hop-count to the sink and determines its initial state in the same way as for the linear networks above. The base-station assigns a unique ID to every branch. The information about the number of nodes in each branch is collected and disseminated to all the nodes by the base-station. After the initialization phase, each node is aware of (1) its initial state (T, I, or R); (2) its branch ID; and (3) the number of nodes, or equivalently, the number of time slots, in each branch of the network. Note that no node, including the base-station, needs to be aware of the entire network topology. The total number of transmissions for this initialization process is 3N+k for k branches, which includes N+k time slots for nodes to obtain the hop-counts and branch IDs, N time slots for the base-station to collect the number of slots $S_i$ from each branch i, and N time slots for the base-station to distribute $\{S_i\}$ to each node.

Let $S_i$ be the number of time slots left to schedule and $L_i$ be the last time slot scheduled for branch i, respectively. Let $S_i^0$ be the initial value of S which is the total number of time slots for branch i and $L_i^0=0$. At any time slot t, a branch i is called eligible if $t>L_i$. An eligible branch with highest number of time slots left is given priority to be scheduled to forward the packets. In the event of a tie, the branch with lowest ID is given preference. Let i be the branch selected, $S_i \leftarrow S_i-3$ and $L_i \leftarrow L_i+2$, i.e., each time three time slots will be scheduled for a branch. Every node updates this information and makes decision independently at every time slot.

A node with branch ID i is said to be active at t, if $t \leq L_i$. An active node changes its state according to the state transition T→I→R→T.

It has been shown in Gandham that the number of time slots required according to the above-described convergecast-scheduling model for multi-line networks is max(3$n_k$−1,N), wherein N represents the number of nodes in the network and $n_k$ represents the maximum number of nodes in a branch.

Tree Networks

Figure 2:
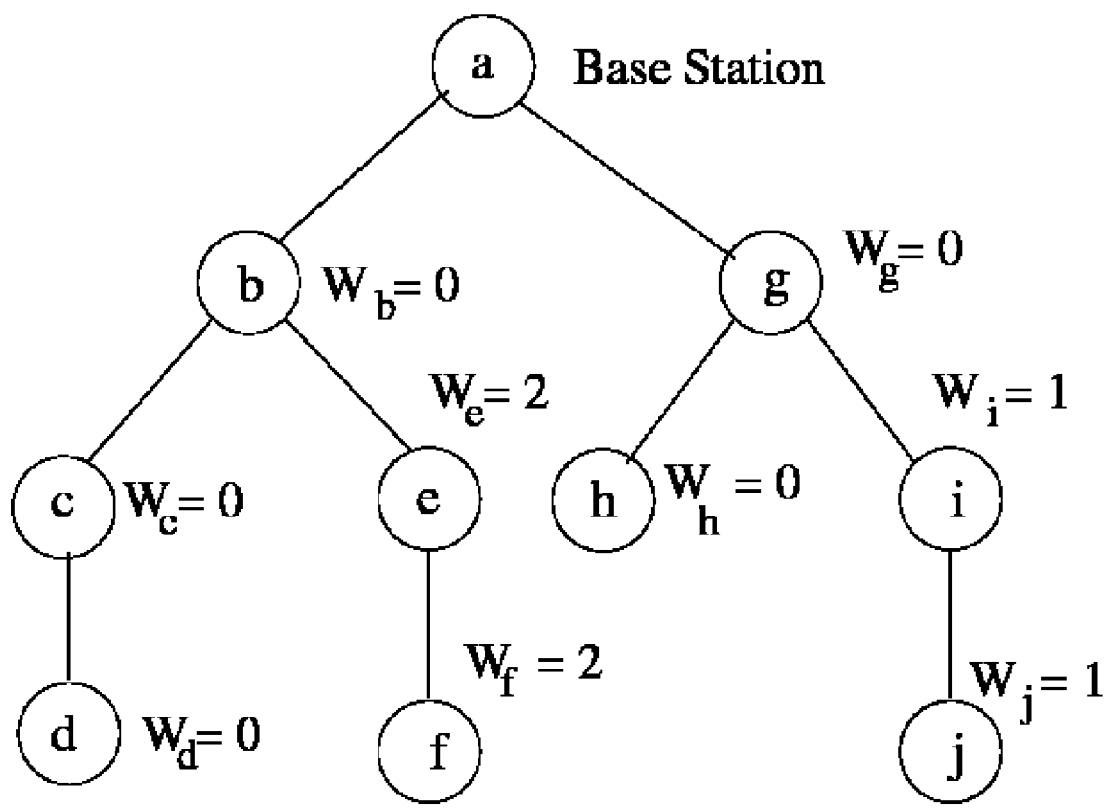
FIG. 2 illustrates a tree network comprising a base-station and a set of nodes in accordance with an embodiment of the present invention.

In the following discussion, we use the term "one-hop-subtree" to refer to any subtree that is rooted at a one-hop neighbor of the sink. The convergecast scheduling model for tree networks is based on the observation that a tree network can be reduced to a multi-line network with each line represented as a combination of line branches of nodes. FIG. 2 illustrates a tree network 200 comprising a base-station and a set of nodes in accordance with an embodiment of the present invention. Note that tree 200 in FIG. 2 can be represented as two-line networks: (i) b-c-d and b-e-frooted at b, and (ii) g-h and g-i-j rooted at g.

Let v be any node in the tree. Let $W_v$ be the number of packets that have to be forwarded by the corresponding subtree before node v becomes active. Let v have k child nodes $v_1, v_2, \ldots, v_k$. Let $N_1, N_2, \ldots, N_k$ respectively be the number of nodes in each subtree rooted at v. Then $W_{v_1}=W_v$, i.e., $v_1$ (the first child node) becomes active along with v. $W_{v_2}=W_v+N_1$, i.e., node $v_2$ becomes active after all the packets in subtree rooted at $v_1$ have reached the node v. Similarly, $$\forall\, i \leq k,\ W_{v_i} = \sum_{j=1}^{i-1} N_j + W_v.$$

To schedule in a tree network, nodes coordinate to determine their respective $W_v$ values in the initialization phase. For example, an in-order tree traversal initiated by the sink can be used. FIG. 2 shows the value of $W_v$ at each node. The active time slot window of a node v is $[3W_v+1, 3(W_v+N_v)]$ which can be set at each node before the convergecast starts.

Note that all the one-hop-subtree (e.g. subtrees rooted at nodes b and g in FIG. 2 can be scheduled concurrently as in a multi-line network described above. Each one-top-subtree corresponds to a branch in the multi-line network. An eligible one-hop-subtree with highest number of time slots left will be scheduled in each time slot; a one-hop-subtree i is said to be "eligible" in time slot t if $t>L_i$. A one-hop-subtree i is active if $t \leq L_i$. A node with active window $[w_1, w_2]$ is active if its one-hop-subtree is active and $w_1 \leq t_b^i \leq w_2$, wherein $t_b^i$ is the branch time of this one-hop-subtree, which is increased by one every time this one-hop-subtree is active.

It has been shown in Gandham that the number of time slots required by the above-described convergecast scheduling model for tree networks is at most max(3$n_k$−1,N), wherein $n_k$ represents the number of nodes in the largest one-hop-subtree. For example, the network shown in FIG. 2 can be viewed as a two-line network, and 14 ($n_k$=5) time slots are required to complete a convergecast. For tree networks, in addition to the information required for multi-line networks, each node v has to know its active window. Again, no node has information about connectivity of the whole network, and the initialization cost is 3N+k transmissions.

General Networks

For networks of general topology, a breadth first search (BFS) spanning tree is first constructed and then the convergecast scheduling model described for the tree network above is applied to the spanning tree.

In a general network, we need to consider the interference due to edges that are not part of the spanning tree. Given a spanning tree, we classify the edges of a network as "spanning tree edges" and "non-spanning tree edges." As the names suggest, spanning tree edges are part of the constructed spanning tree, wherein non-spanning tree edges are not part of the constructed spanning tree.

Two one-hop-subtrees, for example A and B, are said to be interfering if there exist a non-spanning tree edge (a, b) such that a is in A and b is in B; (A,B) is referred to as a "conflicting-subtree-pair" and the edge (a, b) is referred to as an "interfering-edge." If multiple one-hop-subtrees are scheduled simultaneously, interfering-edges may result in collisions. Hence, in a time slot t we schedule an eligible one-hop-subtree which has the maximum number of packets left and does not interfere with active one-hop-subtrees.

During the initialization phase, nodes announce their one-hop-subtree IDs to all the neighbors. As a result, nodes can learn about existence of conflicting-subtree-pairs and report to the base-station. For example, if node a in one-hop-subtree A discovers that its neighbor b belongs to a different one-hop-subtree B, then a reports the conflicting subtree pair (A,B) to the sink. After the sink receives all the conflicting subtree pairs, a "conflict map" M is disseminated to each node in the network, wherein M(A,B)=1 if (A,B) is a conflict-subtree-pair and M(A,B)=0 otherwise. Using the conflict map M, each node independently schedules its transmissions. Note that for general networks, in addition to the information for tree networks, each node has to know the conflict map M at the initialization phase, which introduces extra communication cost. However, no node is aware of the global connectivity of the network.

Let $J=\{i|t\leq L_i\}$ be the set of active one-hop-subtrees at time slot t and let $L=\{i|L_i<t \wedge \forall j\in J, M(i,j)=0\}$ be the set of eligible one-hop-subtrees to schedule. We refer to this filtering (mechanism of not scheduling conflicting subtree-pairs in parallel) as "conflicting resolution" (CR). Because this filtering mechanism is conservative, the resulting schedule might not be optimal. However, it has been shown in simulations that for a network of N nodes about 1.5 N time slots are actually needed using this convergecast algorithm. This is about half of 3 N, the upper bound on the number of time slots required by Gandham.

Discussion

Note that the above-described TDMA-based schedules are constructed in a distributive way at each node. The initialization for distributing parameters for the schedules is relatively expensive if the convergecast schedule is used only once. However, in most cases, we assume the network is stable and the convergecast occurs periodically or whenever events are detected.

Also note that even when data are not distributed uniformly across the network, such a collision-free schedule can still be used (although time-optimality cannot be hold). Although the schedules do not consider packet loss for unreliable links, one can use implicit confirmation (i.e., overhearing the transmission of its parent) to estimate packet loss and retransmit the packet at next time slot if no confirmation has been heard.

Note that a sleep schedule can be added so that only nodes that are in active branches and within its active window are awake. With such a sleep scheduling, more than 50% energy can be saved, assuming transmitting, receiving, and idling have similar energy consumption.

Packet Aggregation

For many wireless sensor network applications, the amount of data generated by each node is small. In these applications, packet aggregation may be desirable.

To illustrate the advantages of the packet aggregation, a linear network is first considered. For linear networks, embodiments of the present invention use substantially the same scheduling technique as the basic convergecast scheduling model described above for the linear network. However, instead of transmitting one packet in each time slot, embodiments of the present invention aggregate up to three original packets into a single packet and transmit the single packet in one time slot.

Figure 3:
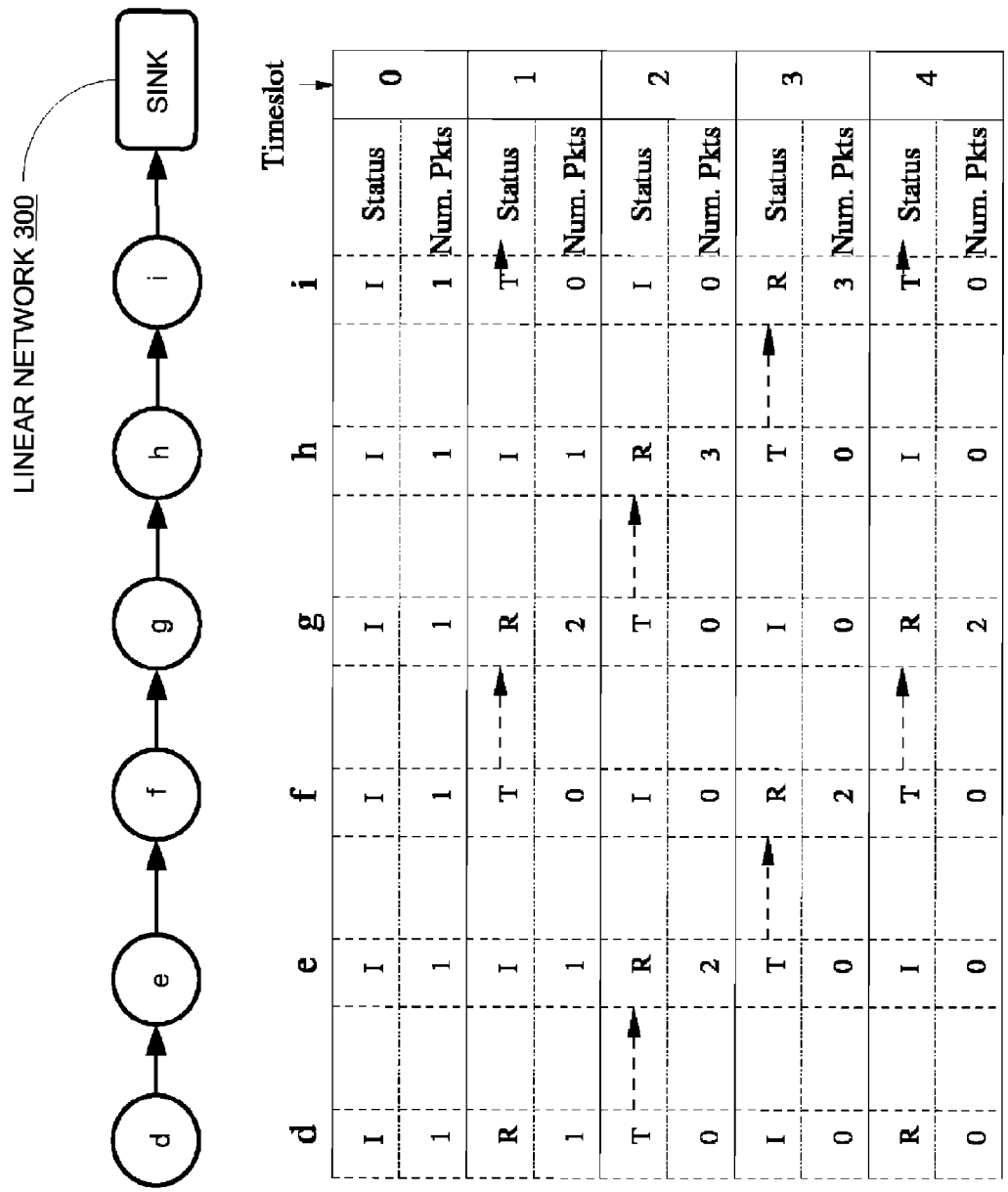
FIG. 3 illustrates the first four time slots in a convergecast scheduling process using a packet aggregation technique in accordance with an embodiment of the present invention.

FIG. 3 illustrates the first four time slots in a convergecast scheduling process using a packet aggregation technique in accordance with an embodiment of the present invention. As illustrated in FIG. 3, a linear network 300 comprises six nodes d, e, f g, h, and i. Note that "Num. Pkts" in FIG. 3 means the number of before-aggregation data packets. It can be observed in FIG. 3 that each node, after receiving a packet, transmits in the next time slot. Hence, it can be shown that after the first three time slots, an aggregated packet traverses one hop in each time slot. For linear networks the following theorem holds:

Theorem 1: The convergecast scheduling using packet aggregation requires at most N+2 time slots in a linear network with N nodes.

Proof: Note that the sink receives the first packet in the first time slot. Subsequently, in every three time slot the sink receives an aggregated packet which contains data from three original unaggregated packets. Hence, the total number of required time slots is $$1+3\left\lceil\frac{N-1}{3}\right\rceil \leq N+2.$$

For multi-line networks, the scheduling technique using packet aggregation is similar to the basic convergecast scheduling model described above for the multi-line network. However, the following modifications is made to the scheduling: $S_i$ is initialized to be the total number of time slots needed to finish the convergecast with aggregation, i.e., $$S_i \leftarrow 1+3\left\lceil\frac{n_i-1}{3}\right\rceil,$$

wherein $n_i$ is the total number of nodes in branch i.

Theorem 2: If N represents the number of nodes in the network, k is the number of branches and $n_k$ represents the maximum number of nodes in a branch, then the number of time slots required by this aggregation-enabled convergecast scheduling technique for multi-line networks is given by $$\max\left(n_k+3, \left\lceil\frac{N+2k}{3}\right\rceil\right).$$

Proof: Let $n_i$ represent the number of nodes in branch i, and $n_k \geq n_{k-1} \geq n_{k-2} \ldots \geq n_1$. When there are at most two branches in the network, it is easy to show that the schedule determined by the aggregation-enabled scheduling technique requires at most $n_k+3$ time slots. This is because the longer branch can always be active and the shorter one will be active after the first time slot. If both branches have equal length, $n_k+2+1$ time slots are needed. Next, we consider networks which have at least three branches. Let $$\hat{n}_k = 1+3\left\lceil\frac{n_k-1}{3}\right\rceil. \text{ If } \hat{n}_k > \left\lceil\frac{1}{3}\left(\sum_{i=1}^{k}\hat{n}_i\right)\right\rceil,$$

branch k will be always active, and at most one more packet to send after branch k finishes sending. Therefore the maximum is $\hat{n}_k+1 \leq n_k+3$.

If $$\hat{n}_k \leq \left\lceil\frac{1}{3}\left(\sum_{i=1}^{k}\hat{n}_i\right)\right\rceil,$$

there are three active branches at every three time slots, and therefore the maximum is $$\left[\frac{1}{3}\left(\sum_{i=1}^{k}\hat{n}_i\right)\right] \le \left[\frac{N+2k}{3}\right].$$

Hence, it can be observed that when the number of branches k is small relative to the number of nodes N, packet aggregation can be quite effective.

For tree networks, the scheduling technique using packet aggregation is similar to the basic convergecast scheduling model described above for the tree network but with a modification of the counter $W_v$. Let v be any node in the tree and let $W_v$ be the number of time slots that have to be passed by the corresponding subtree before node v becomes active. Let v have k child nodes $v_1, v_2, \ldots, v_k$. Let $n_1, n_2, \ldots, n_k$ respectively be the number of time slots for each subtree rooted at the child nodes of v forwarding all its packets. Then $W_{v_1} = W_v$, i.e., $v_1$ (the first child node) becomes active along with v. Furthermore, $$\forall i \le k, \quad W_{v_1} = \sum_{j=1}^{i-1} 3\left[\frac{n_j}{3}\right] + W_v.$$

Theorem 3: Let N be the number of nodes and L be the number of leaf nodes in the network. Let $n_i$ be the number of nodes and $l_i$ be the number of leaf nodes in the ith one-hop-subtree. The maximum number of time slots required for aggregation-enabled convergecast in tree networks is $\max(\hat{n},$ $$\left[\frac{N+2L+2(L-k)}{3}\right]),$$

wherein k is the number of one-hop subtrees and $\hat{n} = \max_i(n_i + 4l_i - 2)$.

Proof: Note that the embodiments of present convergecast scheduling technique reduce the tree network into equivalent linear branches. Furthermore, the number of equivalent linear branches in a tree is equal to the number of leaf nodes in that tree. From theorem 1, we know that at most n+2 time slots are required for convergecast in a linear network with n nodes. Thus in a one-hop-subtree, for example, the ith, at most $n_i+2l_i$ time slots are needed. Whenever the scheduling is switched from one branch to another, it should be ensured that nodes which are common to both the branches are in their initial states. As a result, at most two additional time slots might be required for each switch. Moreover, we have $l_i-1$ branch switches in the ith one-hop-subtree. Hence, we need $n_i+2l_i+2(l_i-1)$ time slots to schedule the transmissions in the ith one-hop-subtree. The result follows from Theorem 2. Q.E.D.

It can be observed that when the number of leaf nodes are large, the aggregation-enabled convergecast scheduling may not result in reduced latency comparing to the original non-aggregation scheduling. However, if the connectivity is relatively sparse, such as in linear or mesh networks, the improvement can be significant. These observations are supported by separate simulation experiments.

Scheduling Convergecast for Sparse Data Sources

The basic convergecast scheduling model described above can be conveniently extended to cases wherein nodes can generate more than one packet by adding n-1 additional nodes for a node associated with n>1 packets, referred to as an "extended basic convergecast scheduling model." However, if many nodes in the convergecast network do not have any packet to transmit, this extended basic scheduling model cannot be optimal for tree networks. For example, consider linear network 300 in FIG. 3. If only node d has a packet, the optimal schedule requires 6 time slots, whereas the extended basic convergecast schedule technique needs 6×3−2=16 time slots. In general, the extended basic scheduling model requires at most 3P time slots where $P=\Sigma_{i=1}^{N}\max(1,p_i)$, wherein $p_i$ is the number of packets in node i. Embodiments of the present invention provide a scheduling technique that uses fewer time slots in the cases of sparse data sources. In particular, embodiment of the present invention computes an optimal scheduling for the convergecast network through a query-based distributed process.

Similar to the approach used in basic convergecast scheduling, we start with linear networks, and then extend to multi-line and tree-networks. We finally add conflict resolution to general networks.

Linear Networks

Given a linear network of N nodes, let node i be the node i-hops from the sink. Let each node in the linear network be associated with three variables: $F_i$, $M_i$, $O_i$, wherein $F_i$ represents first time node i transmits a packet.

$L_i$ represents last time node i transmits a packet.

$O_i$ represents last time node i transmits its own packet.

Let pi be the number of packets generated by node i for transmitting to the base-station. These variables can be set at each node i during a query-based initialization process as follows:

$$F_1 = 1 \quad (1)$$

$$G_i = \begin{cases} F_i + (p_i - 1) & \text{if } i = 1 \\ F_i + 2(p_i - 1) & \text{if } i = 2 \\ F_i + 3(p_i - 1) & \text{if } i > 2 \end{cases} \quad (2)$$

$$F_{i-1} = \begin{cases} \max(1, G_i + 1) & \text{if } i = 1 \\ \max(1, G_i + 2) & \text{if } i > 1 \end{cases} \quad (3)$$

$$O_i = \begin{cases} 0 & \text{if } p_i = 0 \\ G_i & \text{if } p_i > 0 \end{cases} \quad (4)$$

$$M_N = \begin{cases} 0 & \text{if } p_N = 0 \\ G_N & \text{if } p_N > 0 \end{cases} \quad (5)$$

$$M_{i-1} = \begin{cases} O_{i-1} & \text{if } M_i = 0 \\ M_i + 1 & \text{if } M_i > 0 \end{cases} \quad (6)$$

Eqn. (1) means that the first node should send a packet to the based station at time slot 1 (if it has any).

Eqn. (2) determines the time when the node i finishes sending its own packets. Specifically, Eqn. (2) indicates that the node with hop-count of 1 sends at every time slot, the node with hop-count of 2 sends every other time slot, and the rest of the nodes (hop-count>2) send at every three time slots (after sending its first packet). Note that this specific formulation is necessary to avoid interference. Referring to linear network 300 in FIG. 3, when node i is transmitting, node h cannot transmit nor receive from node g because nodes g and i can not transmit at the same time. Note that $G_i$ may be negative if $p_i=0$. Also note that during a distributed scheduling process, $G_i$ is propagated from a parent node i to a child node i+1. This process is described in more detail below in conjunction with FIG. 6.

Eqn. (3) is used to determine that if a node with hop-count i finishes sending its own packets at time $G_i$, when the node with hopcount i+1 starts sending its first packet. Note Eqn. (3) uses different functions to compute for $F_2$ and $F_j$ (j>2).

Eqn. (4) determines the last time slot node i sending its own packets. Note that $O_i=0$ if $p_i=0$ (i.e., node i does not generate any packet), otherwise the value is equal to $G_i$.

Eqn. (5) indicates that the last time the last node (N) transmits is the time it finishes sending its own packets. This is because the last node has no packet to forward.

Eqn. (6) computes the last time the node with hop-count i transmits a packet based on the last time the node with hop-count i+1 transmits a packet. Note that every node just forwards a packet from the child node the next time slot after it receives the packet. Note that during a distributed scheduling process, $M_i$ is passed to a parent node i from a child node i+1. This process is described in more detail below in conjunction with FIG. 6.

To obtain above-described parameters in a distributed manner, $G_i$ is computed at each node i and passed down the links successively to the end of each link; whereas $M_i$ is computed at each node i and passed up toward the first node. Note that the total number of time slots computed by eqns. (1)-(6) is $M_1$, i.e., the last time node 1 transmits to the base-station. Also note that the initialization cost is 2N for N nodes.

In one embodiment of the present invention, during a convergecast operation, each node maintains a time slot t, which increases by 1 at each step. Node i is active if $F_i \leq t \leq M_i$. During the time when node i is active, node i is sending if $F_i \geq t \geq O_i$ and node i is passing if $\max(F_i, O_i) < t \leq M_i$. Unlike the scheduling in the basic convergecast scheduling, nodes start transmitting at $F_i$. During the sending period, node 1 transmits every time slot, node 2 transmits every other time slot, and node i (i>2), transmits every three time slots. During the passing period, every node transmits the packet received from the last time slot.

Figure 4:
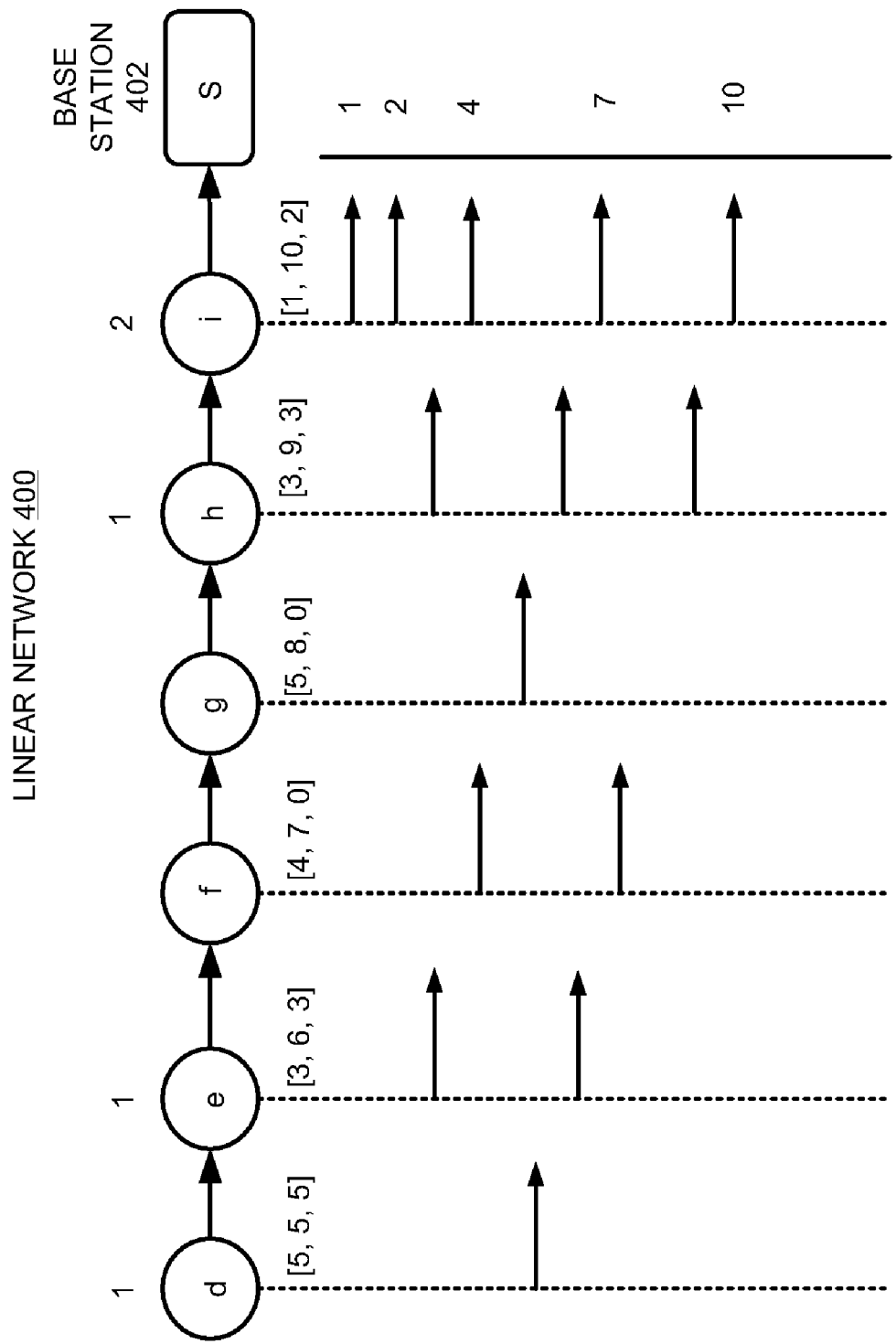
FIG. 4 illustrates a linear network in a sparse-data-source configuration in accordance with an embodiment of the present invention.

FIG. 4 illustrates a linear network 400 in a sparse-data-source configuration in accordance with an embodiment of the present invention. As illustrated in FIG. 4, nodes d, e, and h each has 1 data packet, node i has 2 data packets, and nodes f and g have zero. Also note that each node is associated with an set of [F, M, O] values that have been precomputed during the convergecast scheduling process. The total number of time slots obtained using the above scheduling model is 10. Five packets will arrive at based station 402 in time slots 1, 2, 4, 7, and 10. If using the extended basic scheduling model described above, the total number of time slots required is 3×7−2=19.

Theorem 4: The above scheduling model computes correct timing for all nodes, i.e., all packets shall arrive to the base-station at $M_1+1$, where $M_1$ is the last time slot node 1 transmits.

Proof: All we need to show is that every transmission is successful. We do this by induction. When there is only one node, it is trivially true. When there are two nodes, if node 1 has no packet, it is trivially true. If node 1 has its own packets, node 2 starts transmitting the first packet one time slot after node 1 finishes transmitting its own packet, then node 1 passes the first packet of node 2, and node 2 transmits its second packet, and so on. In this manner, no collision will occur. In the cases of more than two nodes, assume that up to node i no collision occurs. If node i has its own packets, node i+1 start transmitting its first packet two time slots after node i finishes transmitting its own packet. The last packet sent by node i is now at node i−2. Simultaneous transmissions of node i−2 and node i+1 will not cause collision. If node i has no packet of its own, node i+1 will start transmit at $F_i+1=F_i-3+2=F_i-1$, so that node i will pass the packet at $F_i$. According to the assumption, no collision occurs in these cases either. Q.E.D.

Note that the above-described scheduling model is highly efficient in terms of memory used, i.e., at any time, the number of packets at each node is no more than its original number. The following theorem shows that this scheduling technique is time-optimal as well.

Theorem 5: The total number of time slots is $$\max_{1 \leq i \leq N} \left( i - 1 + p_i + 2p_{i+1} + 3 \sum_{j \geq i-2} p_j \right) \quad (7)$$

and it is optimal.

Proof: The total number of time slots to complete the transmission is $M_1$. We use induction to prove that $M_1 = \max_{1 \leq i \leq N}(i-1+p_i+2p_{i+1}+3\Sigma_{j \geq i+2}p_j)$. For one and two nodes, it is obvious to see it is true. Assuming for n nodes it is true. Let's consider the cases for n+1 nodes. If node n+1 has no packet, it is trivially true. If node n+1 has $p_n+1>0$ packets, let i≤n be the last node associated with $p_i>0$. From Eqn. (2)-(6), $M_1''=M_1+(i-1)$, $F_{i+1}=M_i+2$, $F_{n+1}=\max(F_{i+1}-(n-i), 1)$, $M_{n+1}=F_{n+1}+3(p_{n+1}-1)$ and $M_1^{n+1}=M_{n+1}+n$. If $F_{n+1}=F_{i+1}-(n-i)$, $M_1^{n+1}=M_1''+3p_n+1$; otherwise, it is easy to see that both $p_{n-1}=0$, and $p_n=0$, and $M_1^{n+1}=n+1+3(p_{n+1}-1)=(n-1)-1+p_{n-1}+2p_n+3p_{n+1}$. The proof of optimal has been derived in Florens C. and McEliece R., "*Packet Distribution Algorithms for Sensor Networks*," In IEEE INFOCOM, 2003. Q.E.D.

The above-described scheduling model can be conveniently extended to cases when some interference links are larger than transmission links. For example, in FIG. 4, if node g can hear from node i (but cannot transmit to i), i and f cannot transmit at the same time, because g may not receive from f due to interference from i. In general, we let $F_{i+1}=\max(1, G_i+d)$, wherein d is the minimum number that node i and node i−d has no interference. In one embodiment of the present invention, if a convergecast network includes asymmetric links, then only the symmetric links are used for scheduling, while the asymmetric links are used for interference checking.

Multi-Line Networks

For the scheduling model for multi-line networks in the basic convergecast process, each node has to know the number of packets in each branch in order to perform scheduling independently. However, if there are nodes with no data packets at all, scheduling based on the total number of packets may not achieve optimality. For example, a branch may have few packets but takes longer to finish due to longer distances from sources of the packets to the sink. Furthermore, the packet arrival time from each branch is no longer associated with the fixed interval (i.e. every three time slots). For example, in FIG. 4, packets arrive at times 1, 2, 4, 7 and 10. The packet arrival times can be obtained using $F_i$. For kth packet of node i, the arrival time is $F_1+3(k-1)+i-1$ if i≧2 and $F_i+2k-1$ if i=2. Each branch passes the arrival times to the sink node and then the sink node distributes the arrival times to every node in the multi-line network. The total cost of initialization is 3N+k for N nodes and k branches. After initialization, each node, in addition to its own F, M, O values, knows the arrays of arrival times of all the branches.

The convergecast scheduling is similar to the basic convergecast scheduling model for multi-line networks, but with the following exceptions:

Let $a_i$ be the array of arrival times for branch i. The initial last assigned time slot $L_i^0$ is set to be $a_i(1)-1$ where $a_i(1)$ is the first packet arrival time for branch i, and $S_i^o$ is set to be the last element of $a_i$, i.e., the total number of time slots.

Let j be the branch to be selected to transmit at time slot t, $L_j \leftarrow L_j + (a_j(2) - a_j(1) - 1)$, $S_i \leftarrow S_i^o a_j(1)$ and $a_j(k) = a_j(k+1)$.

If this branch is active, the node checks if it currently belongs to sending or passing state using the F,M,O parameters of this node. If it is sending, its transmit state changes according to the number of hops to the sink, i.e., 1 hop: every time slot, 2 hops: every other time slot, and more than 2 hops: every three time slots. If it is passing, it always transmits the packet received in the last time slot.

Note that during convergecast in a multi-line network, only one branch is forwarding a packet (from the first node) to the sink at a given time slot, because the sink cannot receive from more than one node at a given time. In one embodiment of the present invention, multiple branches in a multi-line network take turns (i.e., in an alternating manner) to forward packets to the sink, and only one branch is forwarding at a given time. In this embodiment, when a given branch is active, all the nodes in the branch are active and perform the convergecast according to the predetermined scheduling. Note that multiple branches can be simultaneously active at a given time slot, as long as no more than one branch is forwarding to the sink during this time slot. Also note that an internal clock associated with a branch only advances when the branch is active.

In one embodiment of the present invention, if there is a contention between two or more branches for forwarding packets to the sink, the scheduling model selects a branch to be the active branch from the contending branches based on the remaining number of time slots in a branch. In one embodiment of the present invention, a branch associated with the highest number of remaining time slots receives highest priority to transmit. In a further embodiment of the present invention, the branch associated with the highest number of remaining time slots also receives the highest frequency to transmit to the sink. Similarly, the branch associated with the second highest number of remaining time slots receives the second highest frequency, and so on.

For example, if a multi-line network comprises three branches A, B, and C which are associated with remaining time slots of 50, 50, and 100, respectively, then the scheduling model assigns approximately twice of the forwarding frequency to branch C than to the other two branches. This scheduling allows branch C to complete forwarding at approximately the same time as the other branches, and hence improves the utility of the sink. In one embodiment of the present invention, the scheduling model is designed to maximize the utility of the sink by keeping the sink in a busiest receiving state.

Tree Networks

The scheduling for tree networks is substantially the same as for the multi-line networks, i.e., by reducing each one-hop-subtree to a branch. This reduction process is substantially the same as the process used in the basic convergecast scheduling model for the tree networks. However, the scheduling model herein computes F and M parameters for each node in a one-hop-subtree, while the basic scheduling model does not.

Let v be a node in a one-hop-subtree. Assume v has k children, $v_1, v_2, \ldots v_k$, and let $\overline{M}_{v_i}$ be the last active time slot for node $v_i$ if $F_{v_i} = 1$, then $$F_{v_1} = G_v + d$$

$$M_{v_i} = \begin{cases} F_{v_i} - 1 + \overline{M}_{v_i} & \text{if } \overline{M}_{v_i} > 0 \\ 0 & \text{otherwise} \end{cases}$$

$$F_{v_{i+1}} = \begin{cases} M_{v_i} + 1 + d & \text{if } j = \max_{l \leq i} \{l | M_{v_l} > 0\} \\ G_v + d & \text{otherwise} \end{cases}$$

$$M_v = \max(O_v, \max_i M_{v_i} + 1)$$

wherein d=1 if v is the root of a one-hop-subtree and d=2 otherwise. Each node obtains [F, M, O] values during the initialization process by traversing the tree. For each one-hop-subtree, the traverse of a tree costs 2 n (each node is visited twice) for n nodes in the subtree. The total cost is again 3N+k for N nodes with k one-hop-subtrees.

Figure 5:
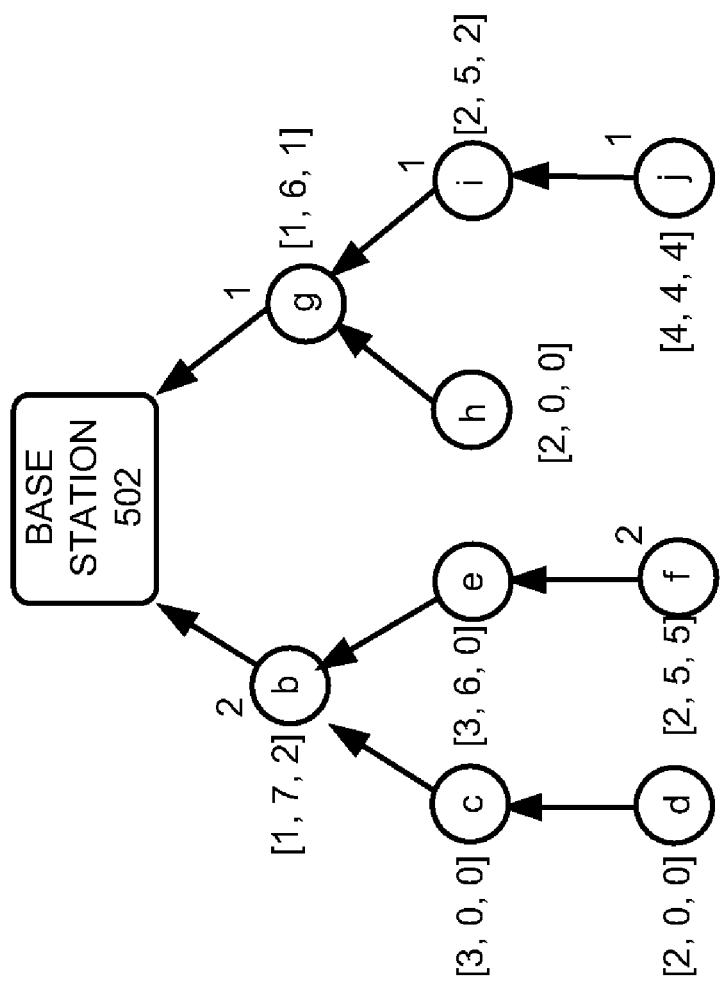
FIG. 5 illustrates a tree-network in a sparse-data-source configuration in accordance with an embodiment of the present invention.

FIG. 5 illustrates a tree-network 500 in a sparse-data-source configuration in accordance with an embodiment of the present invention. Tree network 500 comprises a base-station 502 and a set of nodes b-j. As illustrated in FIG. 5, nodes b and f each has 2 data packets, nodes g, i, and j each has 1 data packet, and other nodes have zero. Also note that each node is associated with an set of [F, M, O] values that have been precomputed during the convergecast scheduling process.

Note that branch rooted at b has arrival times: 1, 2, 4 and 7. The branch rooted at c has arrival times 1, 3 and 6. The total number of time slots using this scheduling technique is 8, wherein time slots 1, 2, 4 and 7 are assigned to branch b, and time slots 3, 5, and 8 for branch c. If the basic scheduling model for tree networks is used, the total number of time slots is 3×7−2=19 instead.

General Networks

Similar to the basic scheduling model for the general networks, a BFS spanning tree is built at first and the tree scheduling technique is applied to the tree. In addition, a filtering mechanism, conflict resolution (CR), can be added so that no two branches that have potential interference may active at the same time.

Process of Performing a Query-Based Scheduling

Figure 6:
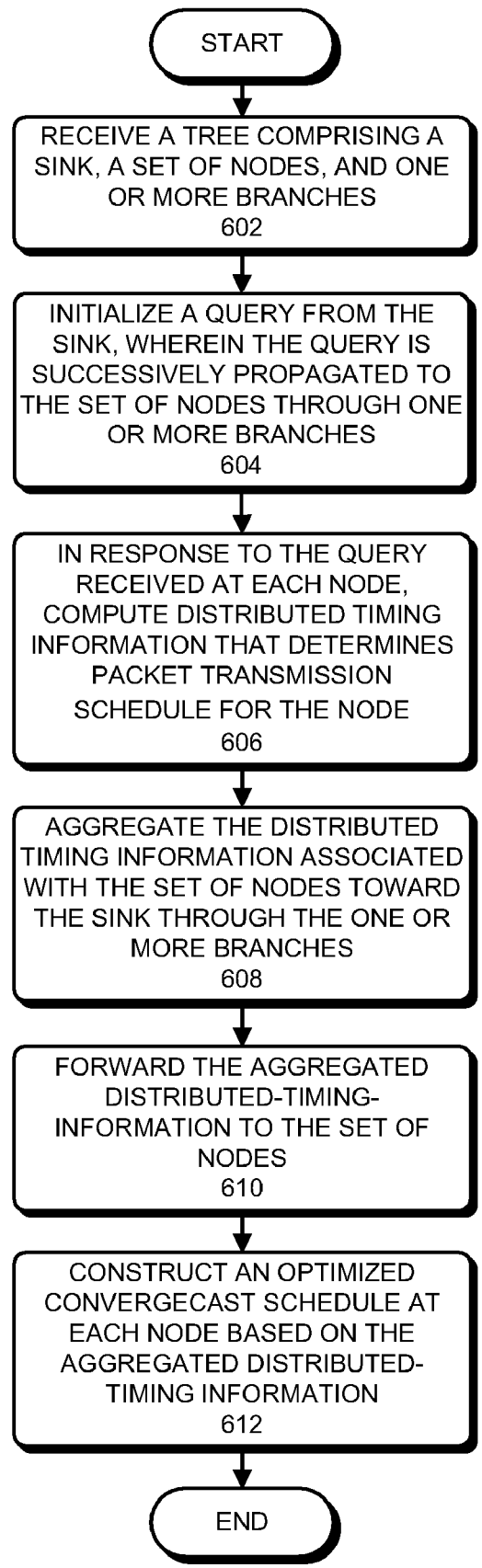
FIG. 6 presents a flowchart illustrating the process of performing a query-based convergecast scheduling in accordance with an embodiment of the present invention.

FIG. 6 presents a flowchart illustrating the process of performing a query-based convergecast scheduling in accordance with an embodiment of the present invention.

During operation, the system receives information representing a tree structure, which comprises a sink and a plurality of nodes (step 602). Note that the tree structure can be a linear network, a multi-line network, or a tree network. Each node in the tree structure can generate from zero to multiple packets to transmit to the sink.

Next, the system initializes a query that originates from the sink, wherein the query is successively propagated to the plurality of nodes through one or more branches (step 604). In response to the query received at each node in the plurality of nodes, the node computes distributed timing information that determines packet transmission schedule for the node (step 606). This step is described in more details below in conjunction with FIG. 7.

The system next aggregates the distributed timing information associated with the plurality of nodes toward the sink through the one or more branches (step 608). In one embodiment, the aggregation of timing information in a given branch is initiated when the query is passed down to the last node (i.e., highest hop-count node) in the branch. In this step, the distributed timing information associated with the plurality of nodes is passed up to the sink (i.e., base-station).

The sink (i.e., base-station) then forwards the aggregated distributed-timing-information to the plurality of nodes (step 610). Next, each node in the plurality of nodes constructs an optimized convergecast schedule for the logical convergecast tree based on the aggregated distributed-timing-information (step 612) and can start performing a convergecast operation based on the optimized convergecast schedule. Note that the above-described scheduling process is also referred to as the initialization phase of a convergecast operation.

Figure 7:
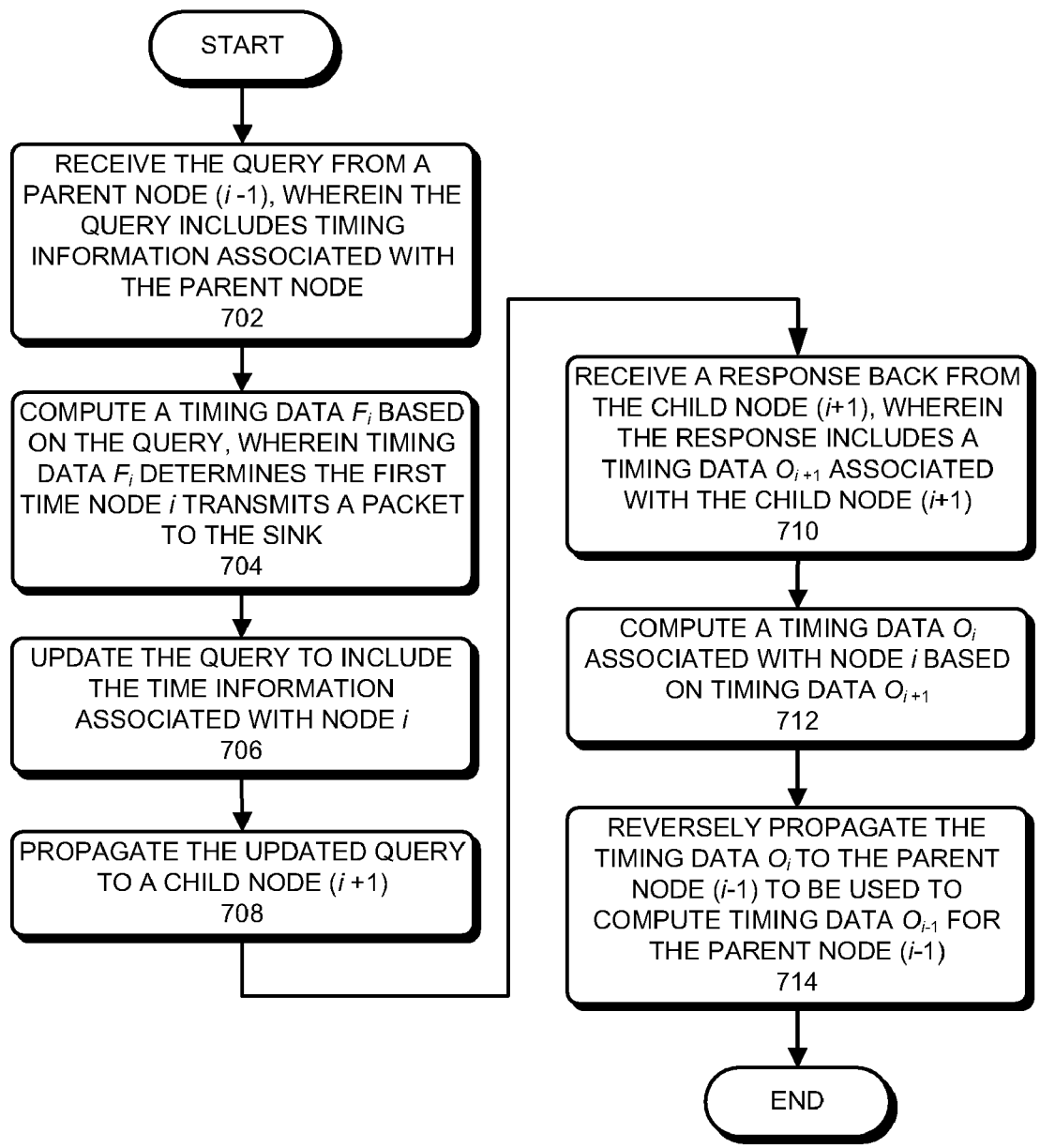
FIG. 7 presents a flowchart illustrating the process of computing the distributed timing information at each node i in accordance with an embodiment of the present invention.

FIG. 7 presents a flowchart illustrating the process of computing the distributed timing information at each node i in accordance with an embodiment of the present invention.

During operation, node i receives the query from a parent node (i−1), wherein the query includes timing information associated with the parent node (step 702). In one embodiment of the present invention, the query includes a timing data $G_{i-1}$ that determines the last time node (i−1) transmits a self-generated packet to the sink. Node i then computes a timing data $F_i$ based on the query, wherein timing data $F_i$ determines the first time node i transmits a packet to the sink (step 704).

Next, node i updates the query to include the time information associated with node i (step 706). In one embodiment of the present invention, node i updates the query by computing an intermediate timing data $G_i$ as a function of timing data $F_i$ and the number of packets $p_i$ generated by node i, wherein $G_i$ determines the last time node i transmits a self-generated packet to the base-station. Node i subsequently includes $G_i$ in the query. Node i then propagates the updated query to a child node (i+1) (step 708).

In one embodiment of the present invention, after passing the updated query to the child node, node i waits for a response from the child node (i+1). In one embodiment of the present invention, the computing process at node i continues when node i receives the response back from the child node (i+1), wherein the response includes a timing data $O_{i+1}$ associated with the child node (i+1) (step 710). More specifically, timing data $O_{i+1}$ determines the last time node (i+1) transmits a packet to the sink. Note that timing data $O_{i+1}$ aggregates effects from all child nodes for node i. Based on timing data $O_{i+1}$, node i then computes timing data $O_i$ associated with node i, which determines the last time node i transmits a packet to the sink (step 712). Node i next reversely propagates the timing data $O_i$ to the parent node (i−1) to be used to compute timing data $O_{i-1}$ for the parent node (i−1) (step 714).

Note that node i represents a node in any branch of the tree that is i-hops to the sink. In particular, if i=1, then $F_1$=1. Moreover, if i=N. i.e., the last node in a branch, steps 708-712 are skipped, and node i directly passes timing information $G_i$=$O_i$ to node (i−1).

Note that the distributed computation process of FIG. 7 in combination with the scheduling process of FIG. 6, are performed in a recursively manner in two passes. In the outgoing pass, the query associated with the timing information is passed downstream from the sink to each of the nodes in each of the branches. In the incoming pass, the query associated with the timing information is passed upstream from the all the nodes to the sink.

Performance Evaluations

To evaluate the performance of above-described convergecast scheduling techniques, several simulation experiments are performed using the technique described in "*High-Level Sensor Network Simulations for Routing Performance Evaluations*," by Y. Zhang et al., Third International Conference on Networked Sensing Systems (INSS06), 2006. A default deterministic radio model described in "Probabilistic Wireless Network Simulator," by G. Simon (http://www.isis-.vanderbilt.edu/projects/nest/prowler/), is used in the simulations. Specifically, all the communication links in the network are assumed symmetric and deterministic. Packets are lost only when there is a collision. The data rate of wireless links is set to be 40 Kbps. The maximum length of a packet is fixed as 960 bits. Note that the convergecast scheduling uses CSMA during the initialization phase. Nodes then switch to TDMA after the initialization. The duration of each time slot is set to 1/40 seconds, which is slightly greater than the time required to transmit one packet of size 960 bits.

We considered a square sensor field of n×n nodes. Nodes are placed on points of a uniform grid. The connectivity of nodes is a mesh, i.e., each node has a maximum four neighbors. Note that the model work for arbitrary connectivity, however, the packet aggregation performance degrades for the high-density networks (according to Theorem 3).

Performance Metrics

We use the following metrics to evaluate the performance of the convergecast scheduling model of the present invention:

Latency: Latency is a measure of the time taken by a packet to reach the base-station from its source node. We report the average latency for convergecast given by $\Sigma_i d_i/n$, wherein n represents the number of packets received by the base-station and $d_i$ represents the latency of the $i_{th}$ packet.

Throughput: Throughput of a network measures the number of data packets received at the base-station per second. Note that the concept of throughput is identical to good-put since only desired data packets are counted.

Success rate: The success rate measures the fraction of packets successfully received by the base-station. It is defined as a ratio between total number of data packets received by the base-station and the total number of data packets generated.

Each simulation experiment was repeated for ten times, both average and standard deviation are then plotted.

Small Data

Assume that each data frame can pack at least three data packets. Four variants of the proposed convergecast scheduling model are tested as listed below. These variants are distinguished based on whether nodes employ packet aggregation and conflict resolution (CR) between different subtrees.

1) without aggregation/CR: Nodes employ neither packet aggregation nor conflict resolution.

2) with aggregation: Nodes employ packet aggregation. However, possible collisions between nodes of different subtrees (i.e., conflict resolution) are ignored.

3) with CR: Nodes do not aggregate packets. However, collisions between different subtrees are eliminated. i.e., conflict resolution is employed.

4) with aggregation/CR: Nodes employ both packet aggregation and conflict resolution.

Note that in the first two variants some packets may be lost due to collisions. We also implemented the following convergecast models to compare with the performance of the proposed convergecast scheduling models:

Directed Flooding: Directed flooding uses hop-count to flood the packets towards the base-station.

Radial Coordination: In radial coordination for convergecast each node waits for an additional time based on the hop-count before transmitting.

Note that both directed flooding and radial coordination employ packet aggregation. At most four packets can be aggregated.

We first report the number of time slots required by all four variants in the model of the present invention. Then, we present the results comparing the proposed convergecast scheduling model with directed flooding and radial coordination convergecast.

Figure 8:
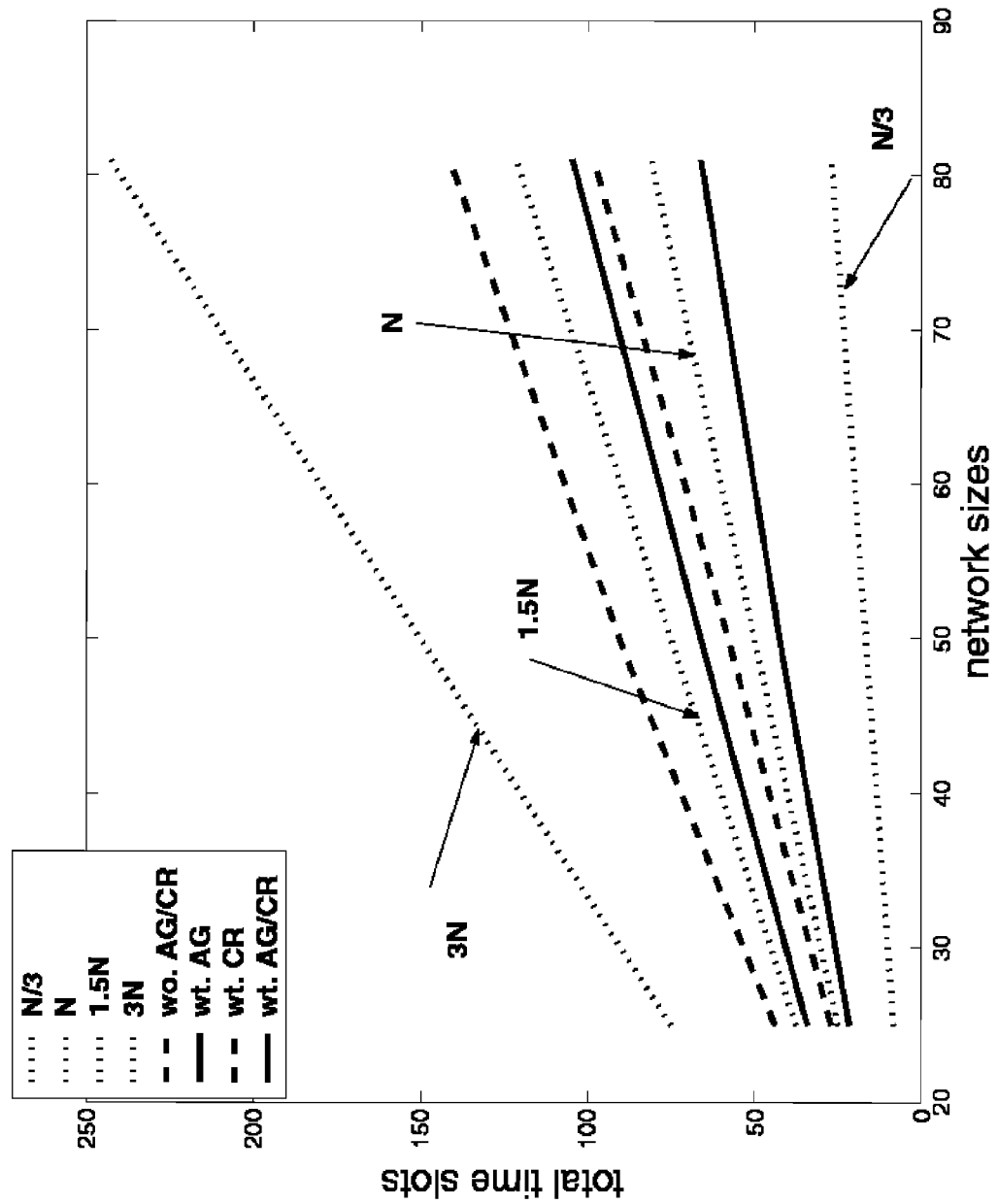
FIG. 8 illustrates the number of time slots used to complete convergecast by all the variants of the proposed scheduling model in accordance with an embodiment of the present invention.

1) Number of Time Slots: FIG. 8 illustrates the number of time slots used to complete convergecast by all the variants of the proposed scheduling model in accordance with an embodiment of the present invention. It can be observed that the number of time slots required increases linearly with the number of nodes. The variants without conflict resolution require 50% fewer time slots comparatively. However, not all packets are guaranteed to arrive at the base-station without employing conflict resolution. The variants with aggregation require significantly fewer time slots in both cases: with or without CR.

Figures 9A, 9B, 9C:
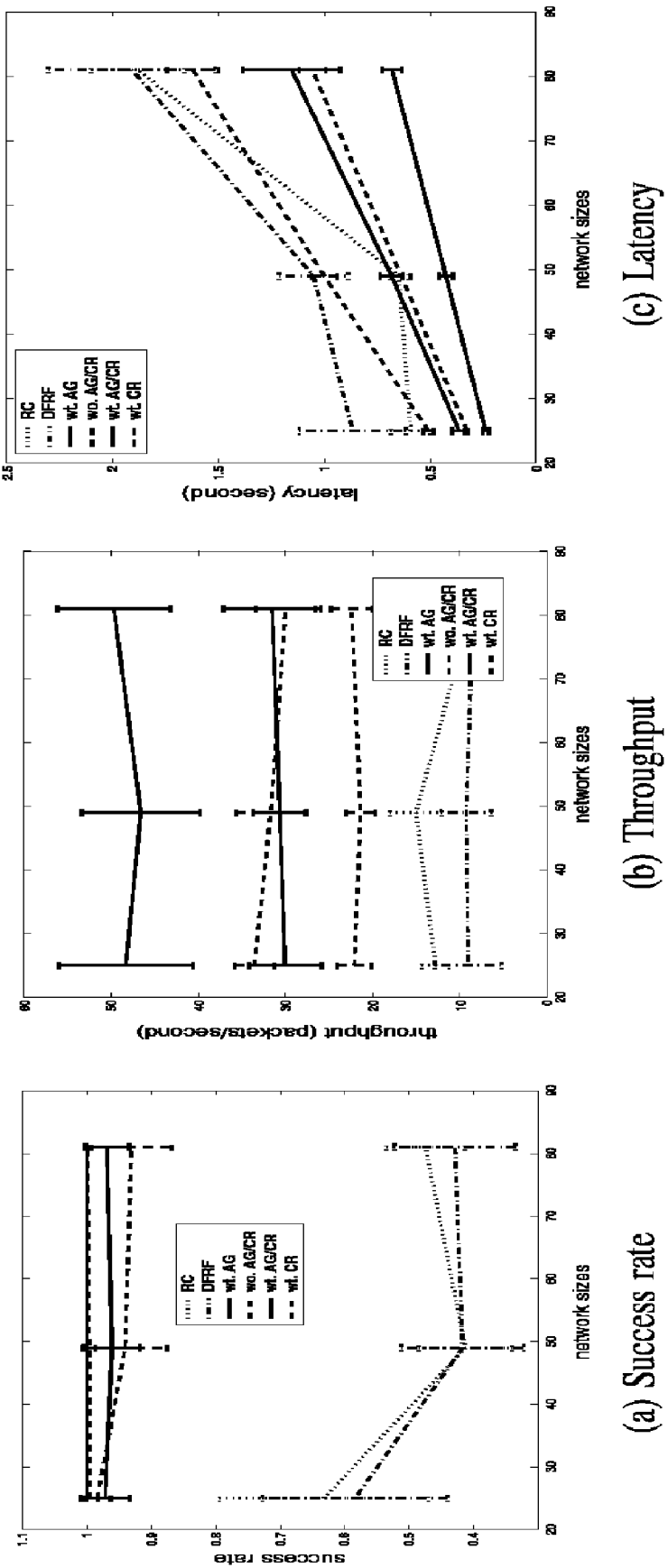
FIG. 9A illustrates the success rate comparisons in accordance with an embodiment of the present invention.
FIG. 9B illustrates the throughput comparisons in accordance with an embodiment of the present invention.
FIG. 9C illustrates the latency comparisons in accordance with an embodiment of the present invention.

2) Performance Comparisons: FIG. 9 illustrates the results of comparing the performance of all six convergecast mechanisms under consideration. Note that in these simulations, every node generates exactly one data packet at the beginning. Specifically, FIG. 9A illustrates the success rate comparisons in accordance with an embodiment of the present invention. FIG. 9B illustrates the throughput comparisons in accordance with an embodiment of the present invention. FIG. 9C illustrates the latency comparisons in accordance with an embodiment of the present invention. It can be observed that the four scheduled convergecast variants outperform both directed flooding and radial coordination on all the three metrics. When conflict resolution is employed, almost 100% of the packets are received by the base-station, as illustrated in FIG. 9A. Note that when an aggregated packet is received, it is counted as multiple constituent packets. An important observation to be noticed is that even without conflict resolution the success rate is significantly higher (about 85%). This result may be explained as: the nodes that interfere and belong two different one-hop-subtrees may not be active simultaneously. In addition, not all nodes of interfering one-hop-subtrees interfere with each other. As a result, not all overlapping transmissions along the interfering subtrees result in collisions.

As is illustrated in FIG. 9B, that scheduling with the packet aggregation but without conflict resolution have the highest throughput and lowest latency. Based on the application requirements, one can trade-off success rate for higher throughput by not implementing the conflict resolution mechanism. The convergecast scheduling model results in low latencies in comparison with directed flooding and radial coordination (see FIG. 9B).

Sparse Data

In this experiment, we compare the proposed scheduling model employing packet counts (PC) for large but sparse data sources with the models designed for each node having one data packet, with or without CR. Specifically, two cases are tested: (1) percentage of nodes having one data packet is varied from 20% to 80%, and (2) given the percentage of nodes having data to be 20%, the number of packets in sources varies from 1 to 7.

Figure 10:
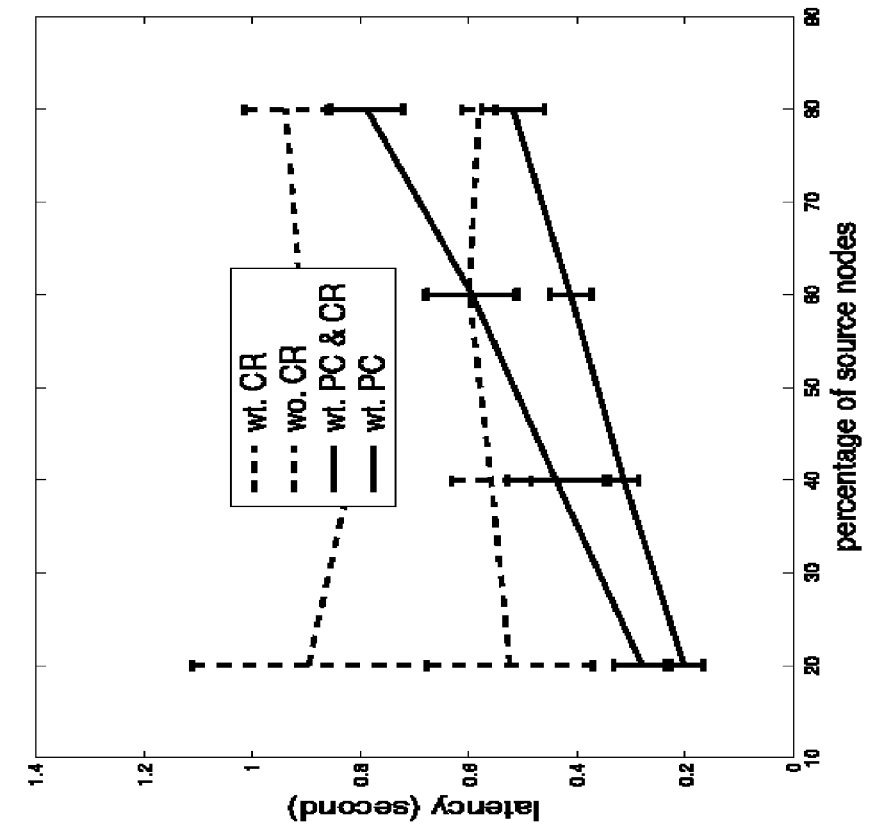
FIG. 10 illustrates performance comparisons of convergecast networks with varying percentage of nodes having one data packet in accordance with an embodiment of the present invention.
Figure 10:
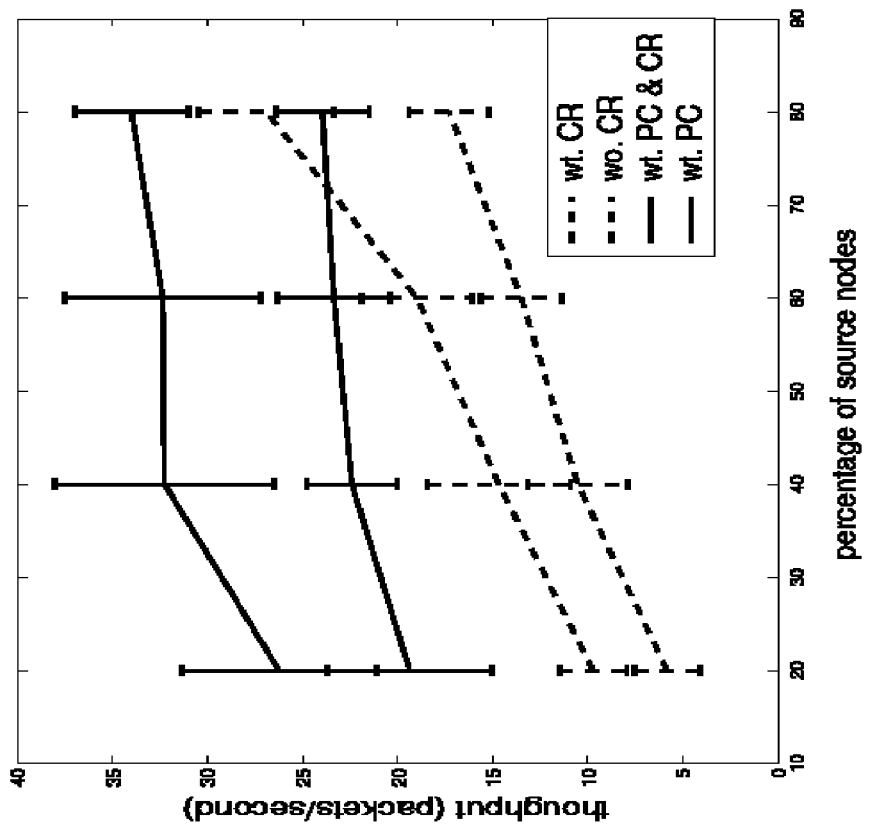

FIG. 10 illustrates performance comparisons of convergecast networks with varying percentage of nodes having one data packet in accordance with an embodiment of the present invention. Specifically, the simulation varies percentage from 20% to 80%. Note that models using PC have high throughput and lower latency, and the difference is greater when the percentage is smaller.

Figure 11:
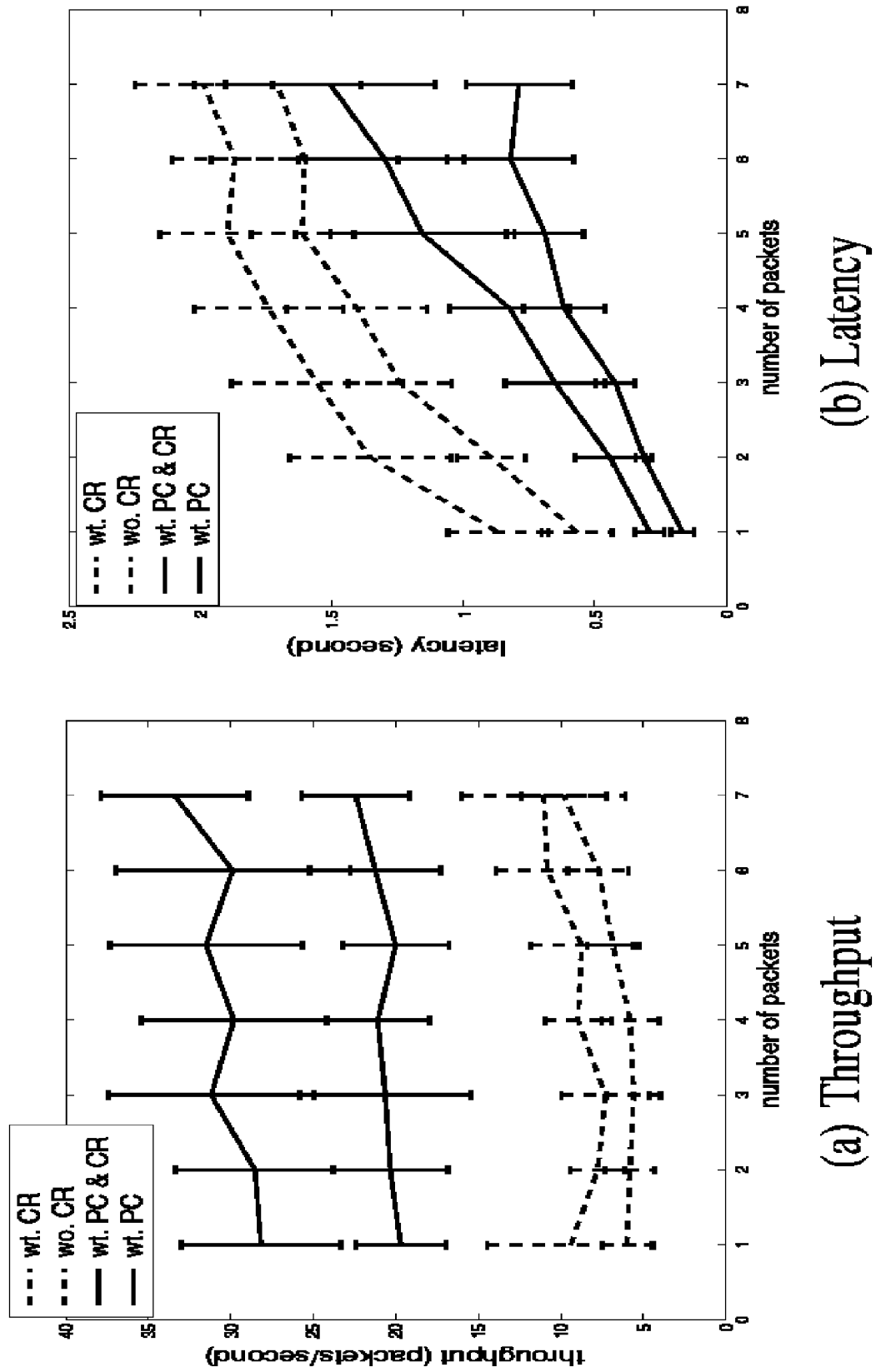
FIG. 11 illustrates performance comparisons of convergecast networks with varying number of packets at each source node in accordance with an embodiment of the present invention.

FIG. 11 illustrates performance comparisons of convergecast networks with varying number of packets at each source node in accordance with an embodiment of the present invention. Specifically, the percentage of nodes having data is set to 20% while the number of data packets in the sources varies from 1 to 7. It can be observed in FIG. 9 that models using PC have high throughput and lower latency. Note that the throughput is almost constant with any number of packets, but the latency increases with the number of packets.

Conclusion

Embodiments of the present invention provide improvements to the minimal-time distributed convergecast scheduling for wireless sensor networks. One embodiment of the present invention provides a technique for convergecast of small data wherein packets can be aggregated on their way to the base-station. Another embodiment of the present invention provides a convergecast scheduling technique for network configurations wherein there is large amount of data but only sparsely distributed within a network.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing a query-based convergecast scheduling in a convergecast network which comprises a base-station and a plurality of nodes, wherein during a convergecast operation the plurality of nodes transmit packets to the base-station, the method comprising:

receiving information which represents a logical convergecast tree for the convergecast network,
wherein the logical convergecast tree comprises one or more branches;
wherein each node in the logical convergecast tree is associated with a hop count for a route to the base-station through a specific branch; and
wherein each node can generate zero or more packets to transmit;

initializing a query from the base-station, wherein the query is successively propagated to the plurality of nodes through the branches;

in response to the query, computing distributed timing information which indicates at least packet transmission information associated with a first node based on a query received from a second node, wherein the query includes timing information associated with the second node;

updating the query to include timing information associated with the first node by computing intermediate timing information based on timing data which indicates the first time the first node transmits a packet to the base station and the number of packets generated by the first node;

aggregating the distributed timing information associated with the plurality of nodes toward the base-station through the branches;

forwarding the aggregated distributed timing information to the plurality of nodes; and constructing, at each node, an optimized convergecast schedule for the logical convergecast tree based on the aggregated distributed timing information.

2. The method of claim 1, wherein computing the timing information which indicates packet transmission from node i which is i-hops from the based station involves:

receiving the query from a parent node (i−1), wherein the query includes timing information associated with the parent node;

computing timing data $F_i$ in the timing information for node i based on the query;

updating the query to include the time information associated with node i; and if a child node (i+1) exists, propagating the updated query to the child node (i+1).

3. The method of claim 2, wherein if a child node (i+1) does not exist, reversely propagating the updated query to the parent node (i−1).

4. The method of claim 2, wherein timing data $F_i$ indicates the first time node i transmits a packet to the base-station.

5. The method of claim 4, wherein updating the query to include the timing information for node i involves:

computing intermediate timing data $G_i$ as a function of timing data $F_i$ and the number of packets $p_i$ generated by node i, wherein $G_i$ indicates the last time node i transmits a self-generated packet to the base-station; and including $G_i$ in the query.

6. The method of claim 5, wherein computing timing data $F_i$ based on the query involves obtaining timing data $F_i$ as a function of intermediate timing data $G_{i-1}$ associated with the parent node (i−1).

7. The method of claim 5, wherein the method further comprises computing timing data $O_i$ for node i based on intermediate timing data $G_i$, wherein timing data $O_i$ indicates the last time node i transmits a self-generated packet to the base-station.

8. The method of claim 2, wherein the method further comprises:

receiving a response back from the child node (i+1), wherein the response includes timing data $L_{i+1}$ in the timing information associated with the child node (i+1);

computing timing data $L_i$ associated with node i based on timing data $L_{i+1}$; and if a parent node (i−1) exists, reversely propagating the timing data $L_i$ to the parent node (i−1) to be used to compute timing data $L_{i-1}$ for the parent node (i−1).

9. The method of claim 8, wherein if a parent node (i−1) does not exist, propagating the updated query to the base-station.

10. The method of claim 8, wherein timing data $L_i$ indicates the last time node i transmits a packet to the base-station; and wherein timing data $L_{i+1}$ indicates the aggregated effects from all child nodes for node i.

11. The method of claim 1, wherein constructing the optimized convergecast schedule for the logical convergecast tree involves computing a frequency of sending packets to the base-station for each branch in the set of branches based on the aggregated timing information.

12. The method of claim 11, wherein computing the frequency for each branch based on the aggregated timing information involves assigning a higher frequency to a branch associated with a higher number of remaining time slots to complete the convergecast operation.

13. The method of claim 1, where the method further comprises performing a convergecast operation in the convergecast network based on the optimized convergecast schedule.

14. A non-transitory computer-readable storage medium storing instructions that when executed by a computer cause the computer to perform a method for performing a query-based convergecast scheduling in a convergecast network which comprises a base-station and a plurality of nodes, wherein during a convergecast operation the plurality of nodes transmit packets to the base-station, the method comprising:

receiving information which represents a logical convergecast tree for the convergecast network, wherein the logical convergecast tree comprises one or more branches;

wherein each node in the logical convergecast tree is associated with a hop count for a route to the base-station through a specific branch; and wherein each node can generate zero or more packets to transmit;

initializing a query from the base-station, wherein the query is successively propagated to the plurality of nodes through the branches;

in response to the query, computing distributed timing information which indicates at least packet transmission information associated with a first node based on a query received from a second node, wherein the query includes timing information associated with the second node;

updating the query to include timing information associated with the first node by computing intermediate timing information based on timing data which indicates the first time the first node transmits a packet to the base station and the number of packets generated by the first node;

aggregating the distributed timing information associated with the plurality of nodes toward the base-station through the branches;

forwarding the aggregated distributed timing information to the plurality of nodes; and constructing, at each node, an optimized convergecast schedule for the logical convergecast tree based on the aggregated distributed timing information.

15. The non-transitory computer-readable storage medium of claim 14, wherein computing the timing information which indicates packet transmission from node i which is i-hops from the based station involves:

receiving the query from a parent node (i−1), wherein the query includes timing information associated with the parent node;

computing timing data $F_i$ in the timing information for node i based on the query;

updating the query to include the time information associated with node i; and if a child node (i+1) exists, propagating the updated query to the child node (i+1).

16. The non-transitory computer-readable storage medium of claim 15, wherein if a child node (i+1) does not exist, reversely propagating the updated query to the parent node (i−1).

17. The non-transitory computer-readable storage medium of claim 15, wherein the method further comprises:

receiving a response back from the child node (i+1), wherein the response includes timing data $L_{i+1}$ in the timing information associated with the child node (i+1);

computing timing data $L_i$ associated with node i based on timing data $L_{i+1}$; and if a parent node (i−1) exists, reversely propagating the timing data $L_i$ to the parent node (i−1) to be used to compute timing data $L_{i-1}$ for the parent node (i−1).

18. The non-transitory computer-readable storage medium of claim 17, wherein if a parent node (i−1) does not exist, propagating the updated query to the base-station.

19. The non-transitory computer-readable storage medium of claim 14, wherein constructing the optimized convergecast schedule for the plurality of nodes involves computing a frequency of sending packets to the base-station for each branch in the set of branches based on the aggregated timing information.

20. The non-transitory computer-readable storage medium of claim 19, wherein computing the frequency for each branch based on the aggregated timing information involves assigning a higher frequency to a branch associated with a higher number of remaining time slots to complete the convergecast operation.

21. The non-transitory computer-readable storage medium of claim 14, wherein where the method further comprises performing a convergecast operation in the convergecast network based on the optimized convergecast schedule.

22. An apparatus that performs a query-based convergecast scheduling in a convergecast network which comprises a base-station and a plurality of nodes, wherein during a convergecast operation the plurality of nodes transmit packets to the base-station, the apparatus comprising:
   a receiving mechanism configured to receive information which represents a logical convergecast tree for the convergecast network,
      wherein the logical convergecast tree comprises one or more branches;
      wherein each node in the logical convergecast tree is associated with a hop count for a route to the base-station through a specific branch; and
      wherein each node can generate zero or more packets to transmit;
   an initialization mechanism configured to initialize a query from the base-station, wherein the query is successively propagated to the plurality of nodes through the branches;
   a computing mechanism configured to compute distributed timing information which indicates at least packet transmission information associated with a first node based on a query received from a second node, wherein the query includes timing information associated with the second node when the query is received;
   an updating mechanism configured to update the query to include timing information associated with the first node by computing intermediate timing information based on timing data which indicates the first time the first node transmits a packet to the base station and the number of packets generated by the first node;
   an aggregation mechanism configured to aggregate the distributed timing information associated with the plurality of nodes toward the base-station through the branches;
   a forwarding mechanism configured to forward the aggregated distributed-timing-information to the plurality of nodes; and
   a construction mechanism configured to construct, at each node, an optimized convergecast schedule for the logical convergecast tree based on the aggregated distributed-timing-information.

23. A method for optimizing packet transmission during a convergecast operation in a convergecast network comprising a base-station and a plurality of nodes, wherein during the convergecast operation the plurality of nodes transmit packets to the base-station, the method comprising:
   receiving a request to perform the convergecast operation in the convergecast network;
   scheduling packet transmission for each of the plurality of nodes based on a set of predetermined criteria to obtain a scheduled order; and
   performing packet transmissions in a logical convergecast tree using the scheduled order, which comprises aggregating multiple packets into a single packet to reduce transmission overhead.

24. The method of claim 23, wherein the multiple original packets are data packets comprising a small amount of data.

* * * * *